(12) United States Patent
Kiran B S (10) Patent No.: US 12,545,188 B2
(45) Date of Patent: Feb. 10, 2026

(54) CAMERA ASSEMBLY

(71) Applicant: Volvo Truck Corporation, Gothenburg (SE)

(72) Inventor: Shashi Kiran B S, Bangalore Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 115 days.

(21) Appl. No.: 18/498,676

(22) Filed: Oct. 31, 2023

(65) Prior Publication Data

US 2024/0166132 A1 May 23, 2024

(30) Foreign Application Priority Data

Nov. 23, 2022 (EP) ..................................... 22209017

(51) Int. Cl.
| | |
|---|---|
| *B60R 1/27* | (2022.01) |
| *B60R 11/00* | (2006.01) |
| *B60R 11/04* | (2006.01) |
| *B60S 1/56* | (2006.01) |
| *G02B 27/00* | (2006.01) |

(52) U.S. Cl.
CPC ................ *B60R 1/27* (2022.01); *B60R 11/04* (2013.01); *B60S 1/56* (2013.01); *G02B 27/0006* (2013.01); *B60R 2011/004* (2013.01)

(58) Field of Classification Search
CPC ..... B60R 1/27; B60R 11/04; B60R 2011/004; B60R 1/23; B60R 2300/105; B60R 2300/802; B60S 1/56; B60S 1/54; B60S 1/52; G02B 27/0006
See application file for complete search history.

(56) References Cited

U.S. PATENT DOCUMENTS

| | | | |
|---|---|---|---|
| 10,919,452 B2 * | 2/2021 | Berne | B60R 1/26 |
| 2016/0148062 A1 * | 5/2016 | Fürsich | H04N 23/698 |
| | | | 348/36 |
| 2017/0015248 A1 | 1/2017 | Baur | |

(Continued)

FOREIGN PATENT DOCUMENTS

| | | |
|---|---|---|
| CN | 110303985 A | 10/2019 |
| CN | 112406709 A | 2/2021 |

(Continued)

OTHER PUBLICATIONS

Extended European Search Report for European Patent Application No. 22209017.7, mailed May 12, 2023, 8 pages.

(Continued)

*Primary Examiner* — Farzana Hossain
(74) *Attorney, Agent, or Firm* — Withrow & Terranova, PLLC (57) ABSTRACT

A camera assembly for a vehicle, the camera assembly comprising a camera housing configured to mount to a vehicle cab of the vehicle, a first camera lens of a first camera mounted to a rear side of the camera housing to capture a first image, a second camera lens of a second camera mounted to the rear side of the camera housing to capture a second image, a third camera lens of a third camera mounted to a front side of the camera housing to capture a third image, and a fourth camera lens of a fourth camera mounted to the front side of the camera housing to capture a fourth image.

13 Claims, 5 Drawing Sheets

(56) References Cited

U.S. PATENT DOCUMENTS

| | | | |
|---|---|---|---|
| 2018/0032822 A1* | 2/2018 | Frank | B60R 1/12 |
| 2021/0402925 A1 | 12/2021 | Berne | |
| 2022/0144185 A1* | 5/2022 | Burnette | G01S 13/931 |
| 2022/0250556 A1* | 8/2022 | Kuzdal | B60R 11/04 |
| 2023/0303001 A1* | 9/2023 | Fraley | B60R 1/26 |
| 2024/0116446 A1* | 4/2024 | Harada | B60R 11/04 |
| 2024/0184296 A1* | 6/2024 | Grossman | G01S 13/867 |
| 2025/0222857 A1* | 7/2025 | Rodriguez Barros | B60Q 1/525 |

FOREIGN PATENT DOCUMENTS

| | | |
|---|---|---|
| WO | 2018215811 A1 | 11/2018 |
| WO | 2019106398 A1 | 6/2019 |
| WO | 2022140161 A1 | 6/2022 |

OTHER PUBLICATIONS

Examination Report for European Patent Application No. 22209017.7, mailed Jun. 25, 2025, 6 pages.

\* cited by examiner

CAMERA ASSEMBLY

PRIORITY APPLICATIONS

The present application claims priority to European Patent Application No. 22209017.7, filed on Nov. 23, 2022, and entitled "CAMERA ASSEMBLY," which is incorporated herein by reference in its entirety.

TECHNICAL FIELD

The inventive concept relates generally to image vision for a vehicle. In particular aspects, the inventive concept relates to a camera assembly for a vehicle. The inventive concept can be applied in heavy-duty vehicles, such as trucks, buses, and construction equipment. Although the inventive concept may be described with respect to a particular vehicle, the inventive concept is not restricted to any particular vehicle.

BACKGROUND

To provide an operator of a vehicle with sufficient visibility of the vehicle surroundings, rear view mirrors are conventionally connected to the exterior of a vehicle cabin. In addition to these rear view mirrors, various camera based solutions are also presented. In particular, a rear camera which is activated when the vehicle reverses is a conventional arrangement for passenger cars, as well as for heavy-duty vehicles.

However, the visible sight for operators of heavy-duty vehicles may not always be as good as for operators of passenger cars. In particular, the heavy-duty vehicle operator is sitting in the cabin at a somewhat elevated position compared to the position of an operator of a passenger car. The heavy-duty vehicle operator thus has a slight reduced visibility for positions downwardly in front of the cabin, as well as downwardly on the left- and right-hand side of the cabin.

It is therefore a desire to improve the visibility of the vehicle surroundings for the operators of heavy-duty vehicles, reduce blind spots and risk of accidents.

SUMMARY

According to a first aspect of the inventive concept, there is provided a camera assembly for a vehicle, the camera assembly comprising a camera housing comprising a front side, a rear side longitudinally opposite to the front side, a proximal side, a distal side laterally opposite to the proximal side, and an attachment configured to mount to a vehicle cab of the vehicle, a first camera lens of a first camera, the first camera lens arranged distally, laterally offset from the attachment, the first camera mounted to the rear side of the camera housing to capture a first image within a first rearward field of view, a second camera lens of a second camera, the second camera lens arranged distally, laterally offset from the attachment, the second camera mounted to the rear side of the camera housing to capture a second image within a second rearward field of view, a third camera lens of a third camera, the third camera lens arranged distally, laterally offset from the attachment, the third camera mounted to the front side of the camera housing to capture a third image within a third frontward field of view, the third frontward field of view being distally angled, and a fourth camera lens of a fourth camera, the fourth camera lens arranged longitudinally offset from the attachment, the fourth camera mounted to the front side of the camera housing to capture a fourth image within a fourth frontward field of view, the fourth frontward field of view being proximally angled.

The first aspect of the inventive concept may seek to solve the problem of operator sight in the vicinity of the vehicle. A technical benefit may include that the camera assembly, when mounted to the vehicle cab, is able to capture at least four different areas around the vehicle cab. Improved visibility for the operator may thus be obtained. In particular, the camera assembly may capture the so-called A-pillar blind spot which is a position at the A-pillar not visible by the operator. Hence, safety during operation of the vehicle may be improved. Also, the inventive concept may enable for the removal of conventional rear view mirrors and instead fully rely on the improved images obtained by the cameras.

The wording "rearward field of view" should be construed as rearward when the camera assembly is mounted to the vehicle cab. In a similar vein, the "frontward field of view" should be construed as frontward when the camera assembly is mounted to the vehicle cab. The frontward and rearward field of views are thus in opposite directions.

Furthermore, and as indicated above, the proximal side and the distal side are arranged laterally opposite to each other. The wording "distally offset" should thus preferably be construed as offset in a direction from the proximal side towards the distal side. The wording "longitudinally offset" should preferably be construed as offset in a direction from the rear side towards the front side.

Moreover, the wording "distally angled" should preferably be construed as angled relative a direction from the proximal side towards the distal side. Hence, the third camera preferably captures the third image in an angled direction of which one directional component extends in a direction from the proximal side towards the distal side. Further, the wording "proximally angled" should preferably be construed as angled relative a direction from the distal side towards the proximal side. Hence, the fourth camera preferably captures the fourth image in an angled direction of which one directional component extends in a direction from the distal side towards the proximal side.

In some examples, the first rearward field of view may be at least partly different from the second rearward field of view. An advantage may be that the camera assembly is operable to capture an increased distance and width along e.g. a trailer connected to the vehicle. Hereby, further improved safety may be enabled since the operator may be provided with improved visibility.

In some examples, the front side of the camera housing may comprise a first inclined surface, the third camera mounted to the first inclined surface to capture the third image in a vertical downward direction. An advantage may be that the area in the vicinity of the vehicle at ground level, at which area e.g. pedestrians or surrounding vehicles may be located, can be captured by the third camera. The third camera may advantageously capture the so-called A-pillar blind spot.

In some examples, the front side of the camera housing may comprise a second inclined surface, the fourth camera mounted at the second inclined surface to capture the fourth image in a vertical downward direction. An advantage may be that the camera assembly is able to capture the so-called Class IV area in front of the vehicle.

Preferably, the camera housing comprises an upper surface and a lower surface, i.e. upper and lower relative to each other in the vertical direction when the camera assembly is mounted to the vehicle cab. The vertical downward direction should thus preferably be construed as vertical in a direction from the upper surface towards the lower surface.

In some examples, the camera housing may comprise a first opening and a second opening at the rear side, the first camera arranged in the first opening and the second camera arranged in the second opening. An advantage may be that the first and second cameras can be securely fit to the camera housing.

In some examples, the camera housing may comprise a third opening at the front side, the third camera arranged in the third opening. An advantage may be that the third camera can be securely fit to the camera housing.

In some examples, the camera housing may comprise a fourth opening at the front side, the fourth camera arranged in the fourth opening. An advantage may be that the fourth camera can be securely fit to the camera housing.

In some examples, the first and second cameras may be mounted diagonal relative to each other at the rear side. An advantage may be that the first and second cameras may capture slightly different images.

In some examples, the camera housing may comprise a taper-shaped cross-section. An advantage may be that aerodynamic drag may be reduced. In some examples, the camera housing may comprise a trapezoidal cross-section.

In some examples, the rear side may be a first rear side, wherein the camera housing comprises a second rear side longitudinally opposite the front side, the attachment arranged at the second rear side. An advantage may be that the first and second cameras may be mounted to the camera housing at a distinct distance from the attachment.

In some examples, the camera housing may be elongated and extend from the first rear side to the second rear side. An advantage may be that the first and second cameras may be arranged at a laterally offset position relative to the vehicle cab when the camera assembly is mounted thereto. The first and second cameras may here capture at least one of the first and second image along e.g. a trailer side of a trailer connected to the vehicle.

In some examples, the camera housing may comprise a trapezoidal cross-section along the entire elongation from the first rear side to the second rear side. An advantage may be that the aerodynamic drag can be even further reduced. In some examples, a width of the camera housing may be larger at an upper side of the trapezoidal cross-section compared to a lower side. The air flow exposed to the camera assembly may here be forced downwards from the upper side to the lower side, thereby generating a positive impact on the reduced aerodynamic flow.

In some examples, the camera housing may comprise a first elongated portion extending from the first rear side to the front side. An advantage may be that the first and second cameras may be arranged at longitudinally rearward distance from the front side.

In some examples, the camera housing may comprise an indicator lamp arranged on a first surface of the first elongated portion. An advantage may be that surrounding vehicles or pedestrians can visually receive information that the vehicle is about to turn.

In some examples, the first surface may be downwardly inclined. An advantage may be that the indicator arranged on the downwardly inclined surface will be visible for surrounding vehicles or pedestrians at ground level. By downwardly inclined should preferably be construed as inclined in a direction from the upper side towards the lower side of the camera housing.

In some examples, the camera housing may comprise a second elongated portion extending from the second rear side to the front side. In some examples, the first and second elongated portions may be parallel to each other. In some examples, the camera housing may be U-shaped. An advantage of providing the housing also with a second elongated portion, in particular to form a parallelogram in a U-shape, may be that the different cameras can be mounted at distinct positions relative to the attachment.

In some examples, the attachment may comprise at least one protruding pin, the at least one protruding pin protrudes in a direction away from the front side. An advantage may be that a simple installation to the vehicle cab can be achieved.

In some examples, the attachment may comprises at least one recess, the at least one recess extends in a direction towards the front side. An advantage may be that the camera assembly can be securely fit to a corresponding attachment of the vehicle cab.

In some examples, the camera assembly may further comprise a camera lens cleaner arranged on at least one of the rear side and the front side. An advantage may be that the at least one camera may be kept clean during operation of the vehicle. The camera lens cleaner may thus preferably be mounted to the camera housing for a camera exposed to debris, or to all cameras of the camera assembly.

In some examples, the camera lens cleaner may comprise a water spray injector. An advantage may be that a water spray injector may rapidly clean the camera lens so that the operator of the vehicle is continuously provided with good visibility from the at least one camera, even when operating the vehicle at relatively harsh environmental conditions.

In some examples, the camera lens cleaner may comprise an air blower. An advantage may be that e.g. water from the water spray injector, or rainwater, can be rapidly evaporated and removed from the camera lens.

According to a second aspect, there is provided a vehicle comprising the camera assembly of any of the examples described above in relation to the first aspect.

According to an example embodiment, the vehicle may be devoid of side-view mirrors. The omission of side-view mirrors may advantageously reduce the overall cost of the vehicle, while at the same time providing improved operator visibility of the surroundings of the vehicle during operation.

Further effects and features of the second aspect are largely analogous to those described above in relation to the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the inventive concept cited as examples.

DETAILED DESCRIPTION

Aspects set forth below represent the necessary information to enable those skilled in the art to practice the disclosure.

The inventive concept may seek to improve operator sight in the vicinity of the vehicle. A technical benefit may include that the camera assembly, when mounted to the vehicle cab, is able to capture at least four different areas around the vehicle cab. Improved visibility for the operator may thus be obtained. Further, the inventive concept may be conveniently packaged in one kit for ease of use and assembly.

Reference is made to FIGS. 1A-1D which are exemplary perspective views of a camera assembly 100 according to one example. As will be evident from the below disclosure of e.g. FIGS. 2 and 4, the camera assembly 100 may be advantageously mounted to a vehicle 10. The camera assembly 100 comprises a camera housing 102 in which a first camera 201, a second camera 202, a third camera 203 and fourth camera 204 are mounted.

The camera housing 102 comprises a front side 104 and a rear side 106. The rear side 106 is arranged longitudinally 108 opposite the front side 104, i.e. arranged at an opposite side of the rear side 106 as seen in the longitudinal direction of the camera assembly 100. In particular, the exemplified camera housing 102 comprises a first rear side 106' and a second rear side 106", where each of the first 106' and second 106" rear sides are arranged longitudinally 108 opposite the front side 106. The exemplified camera housing 102 depicted in FIGS. 1A-1D is thus elongated and extends from the first rear side 106' (may also be referred to as a distal rear side) to the second rear side 106" (may be referred to as a proximal rear side). Also, as exemplified in FIGS. 1A-1D, the front side 104 of the camera housing comprises a first inclined surface 110 and a second inclined surface 112. In further detail, the first inclined surface 110 may preferably be angled vertically downwards, i.e. normal vector to the first inclined surface 110 preferably comprises a vertically downward directed component. In a similar vein, the second inclined surface 112 may be angled vertically downwards, i.e. a normal vector to the second inclined surface 112 preferably comprises a vertically downward directed component. As will be evident from the below disclosure, the first 110 and second 112 inclined surfaces may advantageously enable for an improved field of view of the respective cameras mounted thereto. Accordingly, and as exemplified in FIGS. 1A-1D, the first 110 and second 112 inclined surfaces form part of the front side 104.

The camera housing 102 further comprises a proximal side 114 and a distal side 116. The proximal side 114 should preferably be construed as the side of the camera housing 102 which is positioned closest to a longitudinal geometric center axis of a vehicle 10 onto which the camera assembly is mounted. The distal side 116 is arranged laterally 118 opposite to the proximal side 114, i.e. arranged at an opposite side of the camera housing 102 as seen in the lateral direction of the camera assembly 100.

The camera housing 102 also comprises an attachment 120. The attachment 120 is configured to mount to a vehicle cab (see 310 in FIG. 2) of the vehicle 10 described above and depicted in FIGS. 2 and 4. In the example of FIGS. 1A-1D, the attachment 120 is arranged at the second rear side 106" of the camera housing 102. The exemplified attachment 120 comprises at least one protruding pin 122, in the figures illustrated by four protruding pins. The protruding pins 122 protrudes in a direction away from the front side 104. Put it differently, the protruding pins 122 protrude away from the front side in the longitudinal direction 108 of the camera assembly 100. The exemplified attachment 120 also comprises at least one recess 124, in the figures illustrated by two recesses 124. The exemplified recesses 124 extends from the second rear side 106" in a direction towards the front side 104. Put it differently, the recesses 124 extends from the second rear side 106" towards the front side 104 in the longitudinal direction 108. The at least one protruding pin 122 and the at least one recess 124 are configured to be mounted to a structure of the vehicle cab (310 in FIG. 2) for properly attaching the camera assembly. The pins 122 and/or recesses 124 are configured to interlock with corresponding features on the vehicle to mount the camera housing 102 to the vehicle.

Furthermore, the exemplified camera housing 102 comprises a first elongated portion 130. The first elongated portion 130 extends from the first rear side 106' to the front side 104. In particular, the first elongated portion 130 extends substantially in the longitudinal direction 108 from the first rear side 106' to the front side 104. The camera housing 102 also comprises a second elongated portion 132. The second elongated portion 132 extends from the second rear side 106" to the front side 104. In a similar vein as the first elongated portion 130, the second elongated portion 132 is also preferably extending in the longitudinal direction 108 from the second rear side 106" to the front side 104 and its extension is thus substantially parallel to the first elongated portion 130. Moreover, the exemplified camera housing 102 also comprises a third elongated portion 134. The third elongated portion 134 is extending between the first 130 and second 132 elongated portions. Thus, and as depicted in FIGS. 1A-1D, the first 130, second 132 and third 134 elongated portions forms a U-shaped camera housing, where the front side 104 forms part of the third elongated portion 134.

Moreover, the camera housing 102 comprises a trapezoidal cross-section 140. In particular, the exemplified camera housing 102 has a trapezoidal cross-section 140 as seen in a plane perpendicular to the extension of the elongated portions. A width 142 of an upper surface 143 of the camera housing 102 is larger than a width 144 of a lower surface 145 of the camera housing 102. Vertical side surfaces 146, 148 extending between the upper surface 143 and the lower surface 145 are thus downwardly inclined. According to the example depicted in FIGS. 1A-1D, the camera housing 102 comprises a trapezoidal cross-section 140 along the entire elongation from the first rear side 106' to the second rear side 106".

As briefly indicated above, the camera assembly comprises a first camera 201, a second camera 202, a third camera 203 and a fourth camera 204 mounted in the camera housing 102. In particular, the first camera 201 comprises a first camera lens 211 at the first rear side 106'. The first camera lens 211 is arranged distally, laterally offset the attachment 120. Preferably, the first camera 201 may be arranged in a first opening 221 of the camera housing 102 at the first rear side 106'. The first camera lens 211 is thus arranged at a distance from the attachment 120 in the lateral direction 118.

The second camera 201 comprises a second camera lens 212 at the first rear side 106'. The second camera lens is arranged distally, laterally offset from the attachment 120. Hence, the second camera lens 212 is arranged at a distance from the attachment 120 in the lateral direction 118. Preferably, the second camera 201 may be arranged in a second opening 222 of the camera housing 102 at the first rear side 106'. As is exemplified in FIGS. 1A-1D, the first 201 and second 202 cameras, and thus also the first 211 and second 212 camera lenses, are preferably mounted diagonal 150 relative to each other at the first rear side 106'.

Moreover, the third camera 203 comprises a third camera lens 213 at the front side 104. The third camera lens 213 is arranged distally, laterally offset from the attachment 120. The third camera lens 213 is thus arranged at a distance from the attachment 120 in the lateral direction 118. Preferably, the third camera 203 may be arranged in a third opening 223 of the camera housing 102 at the front side 104. As exemplified in FIG. 1B, the third camera 203 may be mounted to the first inclined surface 110 of the front side 104.

The fourth camera 204 comprises a fourth camera lens 214 at the front side 104. The fourth camera lens is arranged longitudinally offset from the attachment 120. Hence, the fourth camera lens 214 is arranged at a distance from the attachment 120 in the longitudinal direction 108. Preferably, the fourth camera 204 may be arranged in a fourth opening 224 of the camera housing 102 at the front side 104. As exemplified in FIG. 1D, the fourth camera 204 may be mounted to the second inclined surface 112 of the front side 104.

Figure 1A:
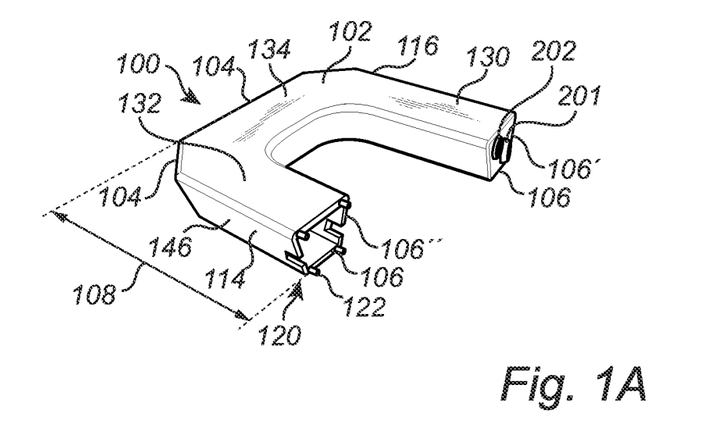
FIGS. 1A-1D are exemplary perspective views of a camera assembly according to one example.
Figure 1B:
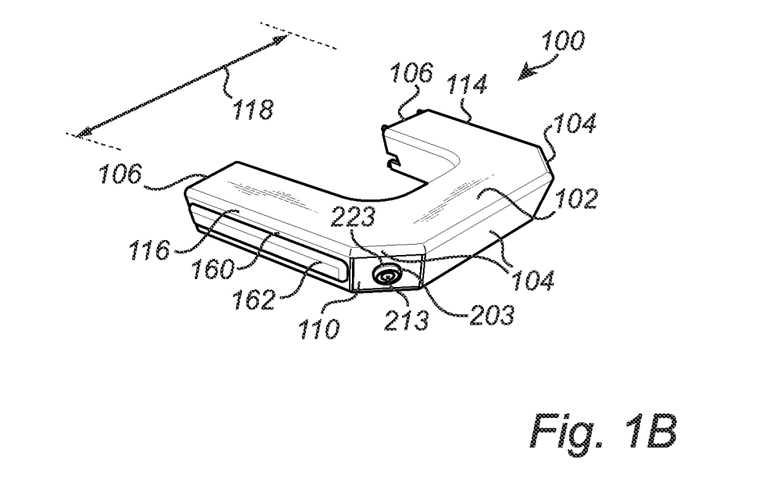
Figure 1C:
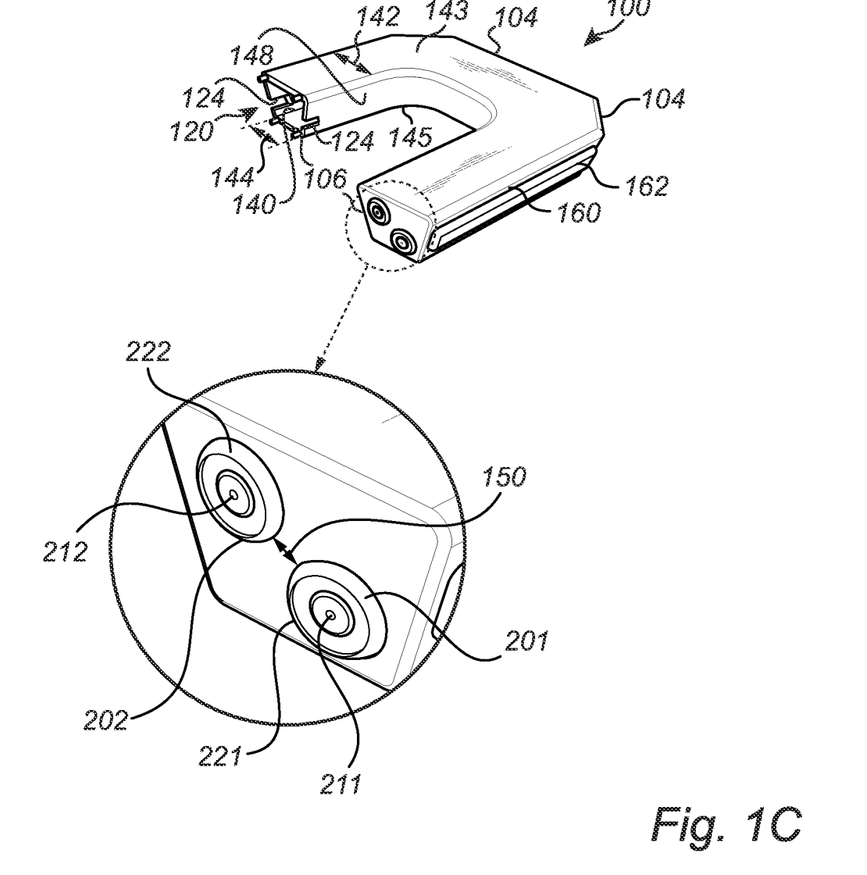
Figure 1D:
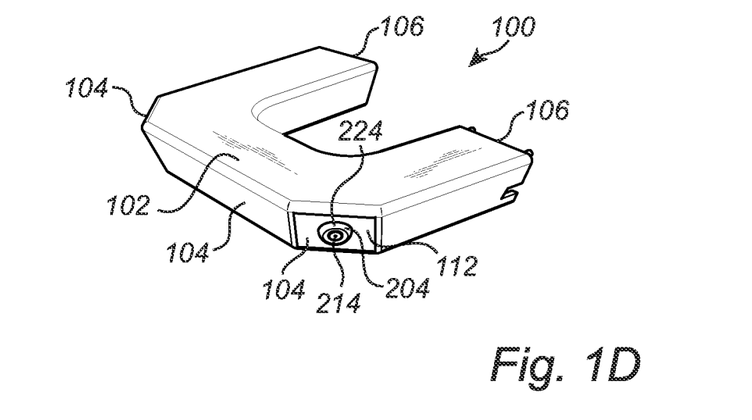

Furthermore, and with reference to FIGS. 1B and 1C, the above described first elongated portion 130 may comprise a first surface 160, which forms part of the vertical side surface 148. The first surface 160 faces away from the vertical side surface 146 of the second elongated portion 132. The first surface 160 is preferably downwardly inclined, and wherein an indicator lamp 162 is arranged on the first surface 160. The indicator lamp 162 may preferably extend along substantially the entire vertical side surface 146. Hereby, an improved detectability of the indicator lamp 162 can be obtained.

Figure 2:
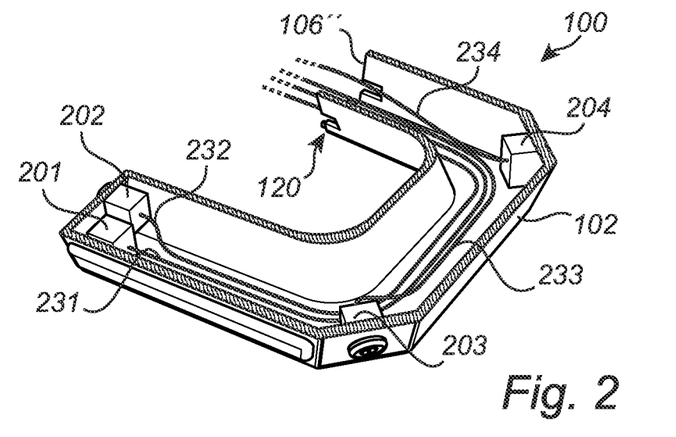
FIG. 2 is a cross-section illustrating the interior of a camera assembly according to one example.

Reference is now made to FIG. 2 which is a cross-section illustrating the interior of a camera assembly 100 according to one example. As can be seen in FIG. 2, the first 201, second 202, third 203 and fourth 204 cameras are arranged in, and mounted to, the camera housing 102. According to the non-limiting example of FIG. 2, a first cable 231 is connected to the first camera 201, a second cable 232 is connected to the second camera, a third cable 233 is connected to the third camera 203, and a fourth cable 234 is connected to the fourth camera 204. The cables 231, 232, 233, 234 are directed out from the camera housing 102 at the second rear side 106" at the position of the attachment 120. The cables 231, 232, 233, 234 are preferably connected to a processor device (not shown) which in turn is arranged to display the images captured by the cameras 201, 202, 203, 204 on a display (not shown) in the vehicle cab. As can be seen in FIG. 2, the interior of the camera housing 102 curved which may reduce the risk of stress concentrations when the camera assembly 100 is mounted to the vehicle.

Figure 3:
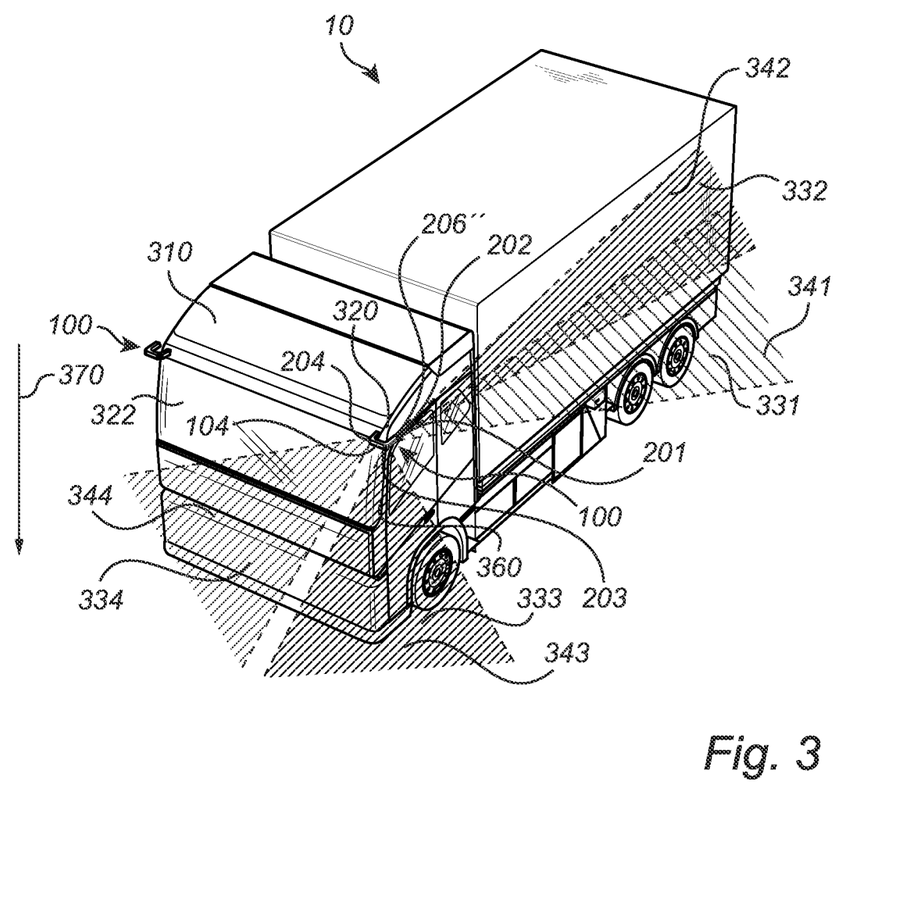
FIG. 3 is a perspective view of a vehicle provided with a camera assembly according to one example.
Figure 4:
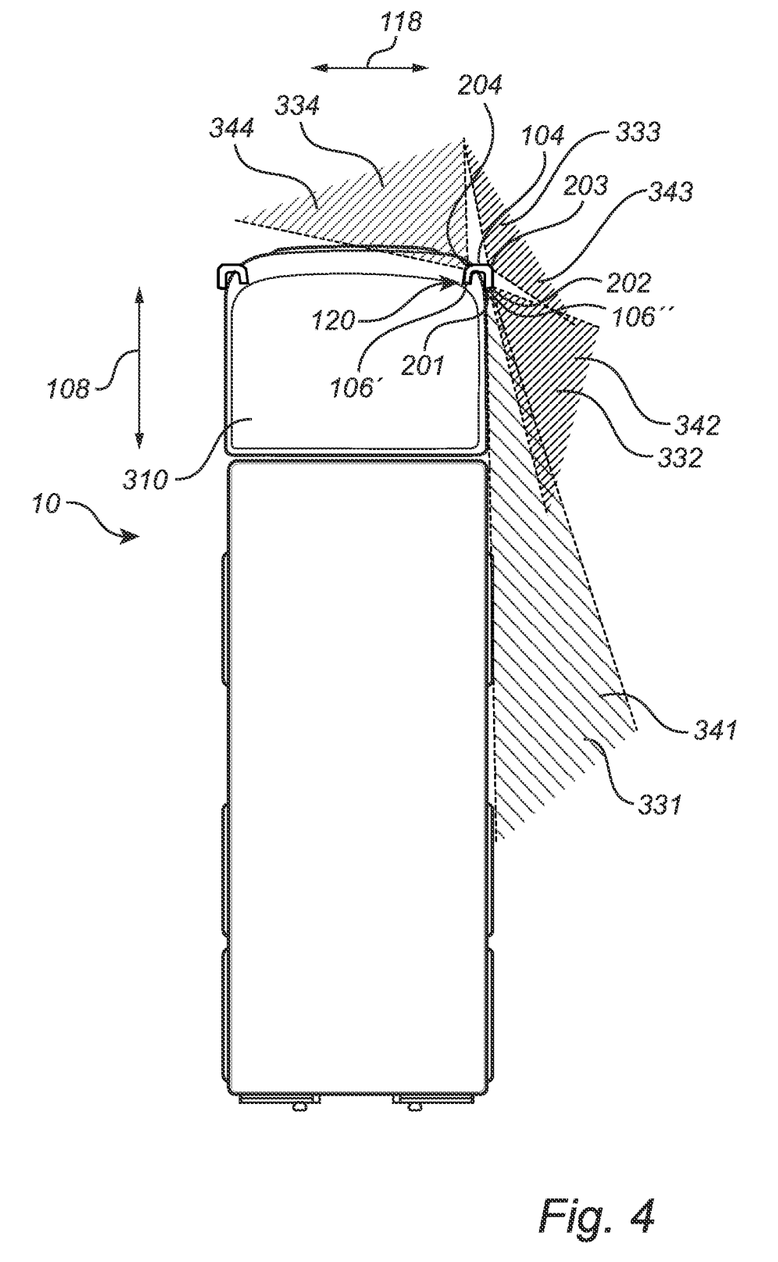
FIG. 4 is a top view of a vehicle provided with a camera assembly according to one example.

Turning now to FIGS. 3 and 4, where FIG. 3 is a perspective view of a vehicle 10 provided with the camera assembly 100 according to one example, and FIG. 4 is a top view of the vehicle 10 provided with the camera assembly 100 according to one example. As can be seen in FIG. 3, the camera assembly 100 is mounted to the vehicle cab 310 of the vehicle 10 at a front lateral end position 320 of the vehicle cab 310. In particular, the camera assembly 100 is preferably mounted at the front lateral end position 320 above a windscreen 322 of the vehicle cab 310. The attachment 120 of the camera assembly 100 is thus preferably mounted to the vehicle cab 310 at the front lateral end position 320 above the windscreen 322

The first camera 201 and the second camera 202 are, as described above, mounted to the second rear side 106" of the camera housing. The first camera 201 is hereby mounted to the camera housing to capture a first image 331 within a first rearward field of view 341. The second camera 202 is mounted to the camera housing to capture a second image 332 within a second rearward field of view 342. The first 201 and second 202 cameras are hereby arranged to capture the so-called classes II, IV and V. Preferably, the first 341 and second 342 rearward field of views are preferably different from each other. As indicated, the first 341 and second 342 rearward field of views may at least partly overlap. The above described diagonal 150 arrangement of the first 201 and second 202 cameras may advantageously facilitate the capture of classes II, IV and V. In particular, the first camera 201 may advantageously capture class IV, while the second camera 202 may advantageously capture class II. Also, the first 201 and second 202 cameras, by means of the relative diagonal displacement, may together capture class V.

The third camera 203 is mounted to the front side 104 of the camera housing. The third camera 203 is mounted to the camera housing to capture a third image 333 within a third frontward field of view 343, where the third frontward field of view 343 is distally angled, i.e. it extends in the longitudinal direction 108 as well as in the lateral direction 118. In particular, the third frontward field of view 343 extends in the longitudinal direction 108 in a forward driving direction of the vehicle, as well as in the lateral direction 118 away from the vehicle cab 310. The third camera 203 is hereby arranged to capture the so-called A-pillar blind spot, which is an area laterally from the A-pillar 360 which can be difficult to visually capture by an operator of the vehicle 10.

The fourth camera 204 is mounted to the front side 104 of the camera housing. The fourth camera 204 is mounted to the front side 104 of the camera housing to capture a fourth image 334 within a fourth frontward field of view 344. The fourth frontward field of view 344 is proximally angled, i.e. it extends in the longitudinal direction 108 as well as in the lateral direction 118. In particular, the fourth frontward field of view 344 extends in the longitudinal direction 108 in a forward driving direction of the vehicle, as well as in the lateral direction 118 towards the vehicle cab 310, i.e. the opposite lateral direction compared to the lateral direction of the third frontward field of view 343. The fourth camera 204 is hereby arranged to capture the so-called class VI in front of the vehicle 10. Put it differently, the extension of the second elongated portion 132 from the attachment 120, as exemplified in FIGS. 1A-1D, may enable the fourth camera 204 to capture the front of the vehicle. The attachment 120 is thus preferably attached to a front mount of the vehicle cabin, above the windscreen, whereby the second camera 204 is arranged in a front of the vehicle cabin by the exemplified U-shaped arrangement.

The camera assembly 100 with the single camera housing 102 can thus advantageously capture each of classes II, IV, V and VI, as well as the A-pillar blind spot. In yet further detail, the single camera assembly 100 can detect any potential obstacle rearwards, along the vehicle by capturing classes II, IV and V, any potential obstacle in front of the vehicle by capturing class VI, as well as obstacles obscured by the A-pillar.

As depicted in FIG. 3, the first camera 201 is preferably arranged to capture the first image 331 in a vertical downward direction 370. Likewise, the second camera 202 is preferably arranged to capture the second image 332 in the vertical downward direction 370. In a similar vein, the third camera 203 is preferably arranged to capture the third image 333 in the vertical downward direction 370, and the fourth camera 204 is preferably arranged to capture the fourth image 334 in the vertical downward direction 370. Hence, the first 331, second 332, third 333 and fourth 334 images each has a component in the vertical downward direction 370.

An advantage of providing the housing to form a parallelogram in a U-shape, may be that the different cameras can be mounted at distinct positions relative to the attachment. Also, the U-shape enables for the cameras to capture the different field of views described above.

Figure 5:
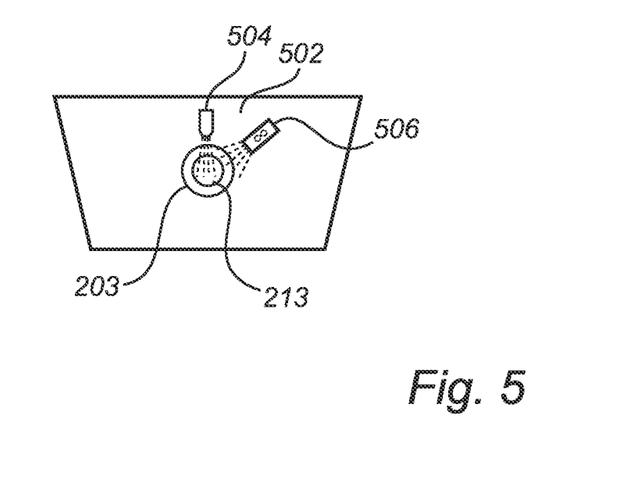
FIG. 5 is an exemplary illustration of a camera lens cleaner according to one example.

Turning now to FIG. 5 which is an exemplary illustration of a camera lens cleaner 502 according to one example. The camera lens cleaner 502 is depicted in relation to the third camera lens 213 of the third camera 203. It should however be readily understood that the camera assembly may comprise a camera lens cleaner 502 for each, or some, of the other camera lenses described above. Preferably, and as illustrated in FIG. 5, the camera lens cleaner 502 may comprise a water spray injector 504. The water spray injector 504 may thus spray water onto the camera lens to remove dirt and debris. The camera lens cleaner 502 may further comprise an air blower 506. The air blower 506 may thus dry the water sprayed onto the camera lens 213.

Figure 6:
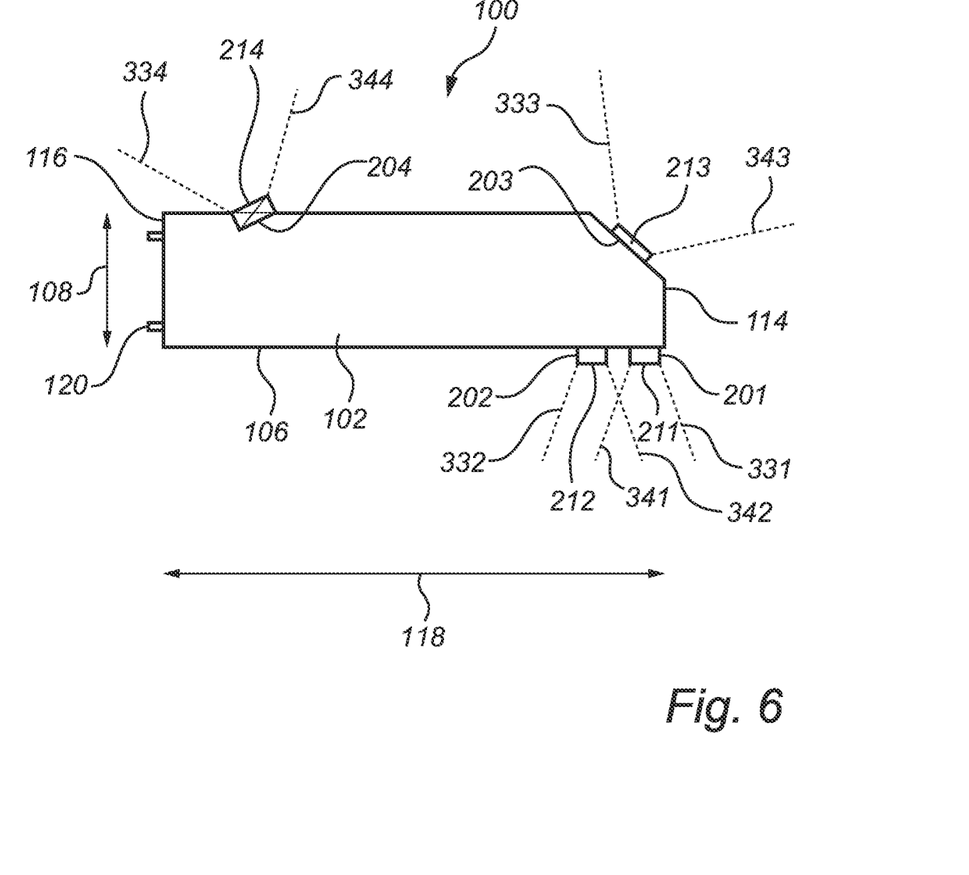
FIG. 6 is a top view of a camera assembly according to another example.

Turning now to FIG. 6, which is a top view of the camera assembly 100 according to another example. The camera assembly 100 comprises a camera housing 102 comprising a front side 104, a rear side 106 longitudinally 108 opposite to the front side 104, a proximal side 114, and a distal side 116 laterally 118 opposite to the proximal side 114. The camera assembly 100 also comprises an attachment 120 configured to mount to the vehicle cab 310 of the vehicle 10 depicted in FIGS. 3 and 4.

Further, the camera assembly 100 also comprises a first camera lens 211 of a first camera 201. The first camera lens 211 is arranged distally, laterally 118 offset from the attachment 120. The first camera 201 is mounted to the rear side 106 of the camera housing 102 to capture a first image 331 within a first rearward field of view 341.

The camera assembly 100 also comprises a second camera lens 212 of a second camera 202. The second camera lens 212 is arranged distally, laterally 118 offset from the attachment 120. The second camera 202 is mounted to the rear side 106 of the camera housing 102 to capture a second image 332 within a second rearward field of view 342.

As also depicted in FIG. 6, the camera assembly 100 comprises a third camera lens 213 of a third camera 203. The third camera lens 213 is arranged distally, laterally 118 offset from the attachment 120. The third camera 203 is mounted to the front side 104 of the camera housing 102 to capture a third image 333 within a third frontward field of view 343. The third frontward field of view 343 is distally angled.

Finally, the camera assembly 100 comprises a fourth camera lens 214 of a fourth camera 204. The fourth camera lens 214 is arranged longitudinally 108 offset from the attachment 120. The fourth camera 204 is mounted to the front side 104 of the camera housing 102 to capture a fourth image 334 within a fourth frontward field of view 344. The fourth frontward field of view 344 is proximally angled.

FIGS. 1A-1D thus illustrate a U-shaped configuration while FIG. 6 illustrates an I-shaped configuration. It should however be readily understood that other shapes and configurations are conceivable. For example, an L-shaped configuration or a T-shaped configuration may also be used.

Example 1. A camera assembly (100) for a vehicle (10), the camera assembly (100) comprising:
- a camera housing comprising a front side, a rear side longitudinally opposite to the front side, a proximal side, a distal side laterally opposite to the proximal side, and an attachment configured to mount to a vehicle cab of the vehicle,
- a first camera lens of a first camera, the first camera lens arranged distally, laterally offset from the attachment, the first camera mounted to the rear side of the camera housing to capture a first image within a first rearward field of view,
- a second camera lens of a second camera, the second camera lens arranged distally, laterally offset from the attachment, the second camera mounted to the rear side of the camera housing to capture a second image within a second rearward field of view,
- a third camera lens of a third camera, the third camera lens arranged distally, laterally offset from the attachment, the third camera mounted to the front side of the camera housing to capture a third image within a third frontward field of view, the third frontward field of view being distally angled, and
- a fourth camera lens of a fourth camera, the fourth camera lens arranged longitudinally offset from the attachment, the fourth camera mounted to the front side of the camera housing to capture a fourth image within a fourth frontward field of view, the fourth frontward field of view being proximally angled.

Example 2. The camera assembly of example 1, wherein the first rearward field of view is at least partly different from the second rearward field of view.

Example 3. The camera assembly of example 1, wherein the front side of the camera housing comprises a first inclined surface, the third camera mounted to the first inclined surface to capture the third image in a vertical downward direction.

Example 4. The camera assembly of example 1, wherein the front side of the camera housing comprises a second inclined surface, the fourth camera mounted at the second inclined surface to capture the fourth image in a vertical downward direction.

Example 5. The camera assembly of example 1,
  wherein the camera housing comprises a first opening and a second opening at the rear side, the first camera arranged in the first opening and the second camera arranged in the second opening,
  wherein the camera housing comprises a third opening at the front side, the third camera arranged in the third opening,
  wherein the camera housing comprises a fourth opening at the front side, the fourth camera arranged in the fourth opening.

Example 6. The camera assembly of example 1, wherein the first and second cameras are mounted diagonal relative to each other at the rear side.

Example 7. The camera assembly of example 1, wherein the camera housing comprises a trapezoidal cross-section.

Example 8. The camera assembly of example 1, the rear side being a first rear side, wherein the camera housing comprises a second rear side longitudinally opposite the front side, the attachment arranged at the second rear side.

Example 9. The camera assembly of example 8, wherein the camera housing is elongated and extends from the first rear side to the second rear side.

Example 10. The camera assembly of example 9, wherein the camera housing comprises a trapezoidal cross-section along the entire elongation from the first rear side to the second rear side.

Example 11. The camera assembly of example 8, wherein the camera housing comprises a first elongated portion extending from the first rear side to the front side.

Example 12. The camera assembly of example 11, wherein the camera housing comprises an indicator lamp arranged on a first surface of the first elongated portion.

Example 13. The camera assembly of example 12, wherein the first surface is downwardly inclined.

Example 14. The camera assembly of example 11, wherein the camera housing comprises a second elongated portion extending from the second rear side to the front side.

Example 15. The camera assembly of example 14, wherein the first and second elongated portions are parallel to each other.

Example 16. The camera assembly of example 1, wherein the camera housing is U-shaped.

Example 17. The camera assembly of example 1, wherein the attachment comprises at least one protruding pin, the at least one protruding pin protrudes in a direction away from the front side.

Example 18. The camera assembly of example 1, wherein the attachment comprises at least one recess, the at least one recess extends in a direction towards the front side.

Example 19. The camera assembly of example 1, further comprising a camera lens cleaner arranged on at least one of the rear side and the front side.

Example 20. The camera assembly of example 19, wherein the camera lens cleaner comprises a water spray injector.

Example 21. The camera assembly of example 19, wherein the camera lens cleaner comprises an air blower.

Example 22. A vehicle comprising the camera assembly of example 1.

Example 23. The vehicle of example 22, wherein the vehicle is devoid of side-view mirrors. The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A camera assembly for a vehicle, the camera assembly comprising:
    a camera housing comprising a front side, a rear side longitudinally opposite to the front side, a proximal side, a distal side laterally opposite to the proximal side, and an attachment configured to mount to a vehicle cab of the vehicle;
    a first camera lens of a first camera, the first camera lens arranged distally, laterally offset from the attachment, the first camera mounted to the rear side of the camera housing to capture a first image within a first rearward field of view;
    a second camera lens of a second camera, the second camera lens arranged distally, laterally offset from the attachment, the second camera mounted to the rear side of the camera housing to capture a second image within a second rearward field of view;
    a third camera lens of a third camera, the third camera lens arranged distally, laterally offset from the attachment, the third camera mounted to the front side of the camera housing to capture a third image within a first frontward field of view, the first frontward field of view being distally angled, wherein the third camera is mounted to a first inclined surface to capture the third image in a vertical downward direction; and
    a fourth camera lens of a fourth camera, the fourth camera lens arranged longitudinally offset from the attachment, the fourth camera mounted to the front side of the camera housing to capture a fourth image within a second frontward field of view, the fourth frontward field of view being proximally angled, the fourth camera is mounted to a the second inclined surface of the camera housing to capture the fourth image in a vertical downward direction, the first and second inclined surfaces facing away from each other.

2. The camera assembly of claim 1, wherein the first rearward field of view is at least partly different from the second rearward field of view.

3. The camera assembly of claim 1:
wherein the camera housing comprises a first opening and a second opening at the rear side, the first camera arranged in the first opening and the second camera arranged in the second opening;
wherein the camera housing comprises a third opening at the front side, the third camera arranged in the third opening; and
wherein the camera housing comprises a fourth opening at the front side, the fourth camera arranged in the fourth opening.

4. The camera assembly of claim 1, the rear side being a first rear side, wherein the camera housing comprises a second rear side longitudinally opposite the front side, the attachment arranged at the second rear side.

5. The camera assembly of claim 4, wherein the camera housing is elongated and extends from the first rear side to the second rear side.

6. The camera assembly of claim 5, wherein the camera housing comprises a trapezoidal cross-section along the entire elongation from the first rear side to the second rear side.

7. The camera assembly of claim 4, wherein the camera housing comprises a first elongated portion extending from the first rear side to the front side.

8. The camera assembly of claim 7, wherein the camera housing comprises an indicator lamp arranged on a first surface of the first elongated portion.

9. The camera assembly of claim 8, wherein the first surface is downwardly inclined.

10. The camera assembly of claim 1, wherein the attachment comprises at least one protruding pin, the at least one protruding pin protrudes in a direction away from the front side.

11. The camera assembly of claim 1, wherein the attachment comprises at least one recess, the at least one recess extends in a direction towards the front side.

12. The camera assembly of claim 1, further comprising a camera lens cleaner arranged on at least one of the rear side and the front side, wherein the camera lens cleaner comprises a water spray injector and an air blower.

13. A vehicle comprising a camera assembly comprising:
a camera housing comprising a front side, a rear side longitudinally opposite to the front side, a proximal side, a distal side laterally opposite to the proximal side, and an attachment mounted to a vehicle cab of the vehicle;
a first camera lens of a first camera, the first camera lens arranged distally, laterally offset from the attachment, the first camera mounted to the rear side of the camera housing to capture a first image within a first rearward field of view;
a second camera lens of a second camera, the second camera lens arranged distally, laterally offset from the attachment, the second camera mounted to the rear side of the camera housing to capture a second image within a second rearward field of view;
a third camera lens of a third camera, the third camera lens arranged distally, laterally offset from the attachment, the third camera mounted to the front side of the camera housing to capture a third image within a first frontward field of view, the first frontward field of view being distally angled, wherein the third camera is mounted to a first inclined surface of the camera housing to capture the third image in a vertical downward direction; and
a fourth camera lens of a fourth camera, the fourth camera lens arranged longitudinally offset from the attachment, the fourth camera mounted to the front side of the camera housing to capture a fourth image within a second frontward field of view, the second frontward field of view being proximally angled, wherein the fourth camera is mounted to a second inclined surface of the camera housing to capture the fourth image in a vertical downward direction, the first and second inclined surfaces facing away from each other.

* * * * *